March 5, 1968  G. H. LOCKWOOD ET AL  3,372,322
STEPPING MOTOR FEED FOR A GRINDER INCLUDING
A HIGH SPEED SLEWING MOTOR
Original Filed Oct. 16, 1963  7 Sheets-Sheet 1

FIG. 1

GEORGE H. LOCKWOOD
GLENN D. JOHNSON
EDWARD G. ROBILLARD
HENRY E. HIRVI
  INVENTORS.

GEORGE H. LOCKWOOD
GLENN D. JOHNSON
EDWARD G. ROBILLARD
HENRY E. HIRVI
INVENTORS.

FIG. 4

GEORGE H. LOCKWOOD
GLENN D. JOHNSON
EDWARD G. ROBILLARD
HENRY E. HIRVI
INVENTORS.

BY
Owen S. Blodgett

FIG. 5

GEORGE H. LOCKWOOD
GLENN D. JOHNSON
EDWARD G. ROBILLARD
HENRY E. HIRVI
INVENTORS.

FIG. 6

GEORGE H. LOCKWOOD
GLENN D. JOHNSON
EDWARD G. ROBILLARD
HENRY E. HIRVI
          INVENTORS.

FIG. 7

GEORGE H. LOCKWOOD
GLENN D. JOHNSON
EDWARD G. ROBILLARD
HENRY E. HIRVI
INVENTORS.

United States Patent Office 3,372,322
Patented Mar. 5, 1968

3,372,322
STEPPING MOTOR FEED FOR A GRINDER
INCLUDING A HIGH SPEED SLEWING
MOTOR
George H. Lockwood, Worcester, Glenn D. Johnson,
Sterling, Edward G. Robillard, Leicester, and Henry
E. Hirvi, Paxton, Mass., assignors to The Heald Machine Company, Worcester, Mass., a corporation of
Delaware
Continuation of application Ser. No. 316,756, Oct. 16,
1963. This application July 11, 1967, Ser. No. 652,625
3 Claims. (Cl. 318—39)

ABSTRACT OF THE DISCLOSURE

The present invention relates to a grinding machine, more particularly, to a grinding machine having a feedscrew for moving the wheel head to bring about a machining operation, the feedscrew being operated by a stepping motor which in turn receives pulses from a generator; a means is provided for regulating the transmission of the pulses to the motor and restricting the said transmission to the time when the spindle is at the end of a longitudinal stroke. In addition, means is provided for transmitting selectively pulses of substantially different frequency.

This is a continuation of our copending application Ser. No. 316,756, filed Oct. 16, 1963, now abandoned.

This invention relates to a machine tool and, more particularly, to a grinding machine arranged to machine an internal surface of revolution in a workpiece.

In the operation of grinding machines and other types of machine tools, it is common practice to feed the tool toward the workpiece surface at the ends of a tool stroke when the tool is out of contact with the surface. This type of feeding must be done in relatively small increments, while there are other situations when it is desirable to move the tool toward the workpiece at a rapid rate or at an intermediate rate. Furthermore, it is desirable to be able to adjust the size of the increments of feed which take place. In order to accomplish all of these functions in a single feed mechanism, it is necessary to provide a very complicated mechanical construction. Such a mechanism gets out of order easily and requires constant attention to keep it in operating condition. In the past, such feed mechanisms have been limited to certain geometric arrangements of the machine tool and lack of flexibility of design layout furnished when the feeding takes place by the use of electrical means. Furthermore, finely adjustable feed mechanisms have been limited to use with small machine tools in which the elements to be moved are relatively light in weight. These and other difficulties experienced with the prior art have been obviated in a novel manner by the present invention.

It is, therefore, an outstanding object of the invention to provide a machine tool having a means for feeding the tool toward the work at a selected rate varying from very high speed to a very slow speed.

Another object of this invention is the provision of a grinding machine having a flexible feed mechanism capable of a wide range of speeds and which is not limited to a specific geometric layout of the machine elements.

A further object of the present invention is the provision of a grinding machine having a feed mechanism which is relatively simple in operation, which is inexpensive to manufacture, and which is capable of a long life of useful service with a minimum of maintenance difficulty.

It is another object of the instant invention to provide a grinding machine having a feed means which is predominantly electrical in character and which is not subject to the geometric layout limitations experienced with a mechanical feed.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompanying drawings in which.

Figure 1:
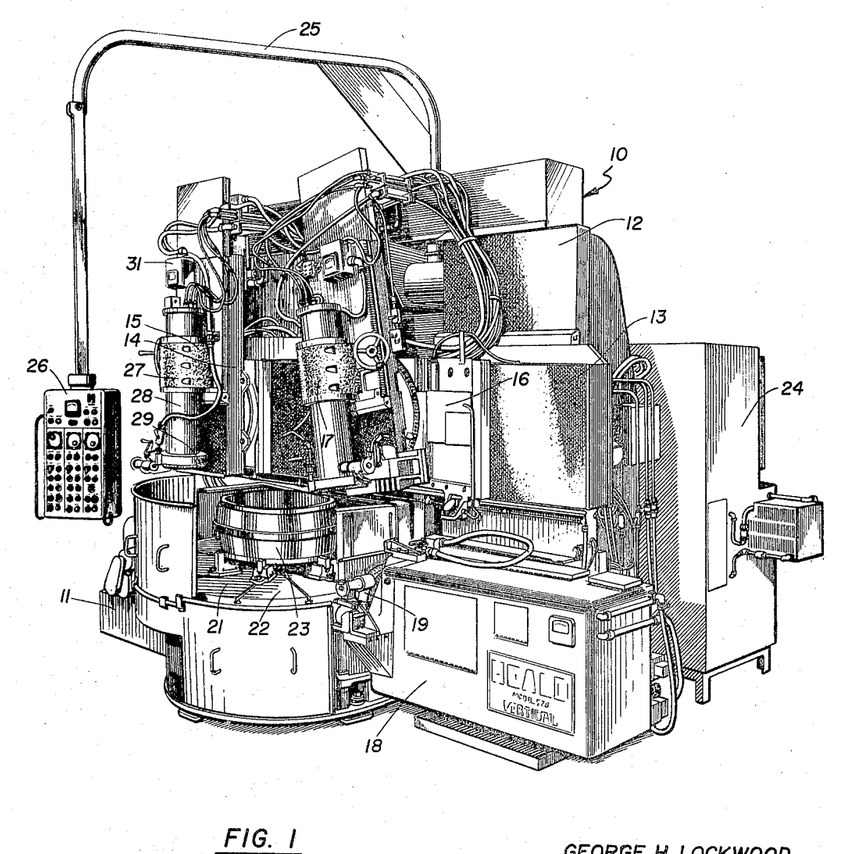
FIG. 1 is a perspective view of a machine tool embodying the principles of the present invention.

Referring first to FIG. 1, which best shows the general features of the invention, the machine tool, indicated by the reference numeral 10, is shown for the purposes of illustration as a vertical internal grinding machine. The machine tool consists of a base 11 from which rises a vertical mounting plate 12. Fastened to the forward surface of the mounting plate is fastened a horizontal rail 13 whose vertical position may be adjusted on occasion by means of a hydraulic cylinder (not shown). The horizontal rail is provided with horizontal ways on which are mounted a left saddle 14 which carries a wheelhead 15 and a right saddle 16 on which is mounted a wheelhead 17. Also mounted on the mounting plate 12 is a lower saddle 18 carrying a wheelhead 19 whose axis is horizontal, the axis of the wheel heads 15 and 17 being substantially vertical.

Mounted on the base 11 is a work table 21 mounted for rotation on a vertical axis and driven by an electric motor (not shown). The work table has a horizontal upper surface 22 adapted to support and hold a workpiece 23 which, for the purposes of illustration, is shown as the inner race of a large, double, tapered-roller bearing. Along the back of the mounting plate 12 is located a control cabinet 24 from which extend control wires, some of which pass through a hollow arm 25 which is pivotal about a vertical axis at the rear of the machine, which extends forwardly and then downwardly, and which terminates in a pendant control box 26.

The wheelheads 15 and 17 are mounted on their saddles 14 and 16, respectively, in conjunction with a swivel means which permits the axis of the wheelhead spindle to be adjusted to a selected angle to the vertical, the axis, however, always remaining in a vertical plane parallel to the front surface of the mounting plate 12. For the purposes of illustration, the description of the controls will be confined to the wheelhead 15, but it will be understood that the wheelheads 17 and 19 are similarly provided with means for reciprocating and feeding them.

The wheelhead 15 consists of a housing 27 in which is slidably mounted a large spindle sleeve 28. The sleeve 28 carries a concentric spindle (not shown) at the end of which is mounted an abrasive wheel 29. On the upper part of the left saddle 14 is mounted a meter 31 indicating the rate of spindle rotation.

Figure 2:
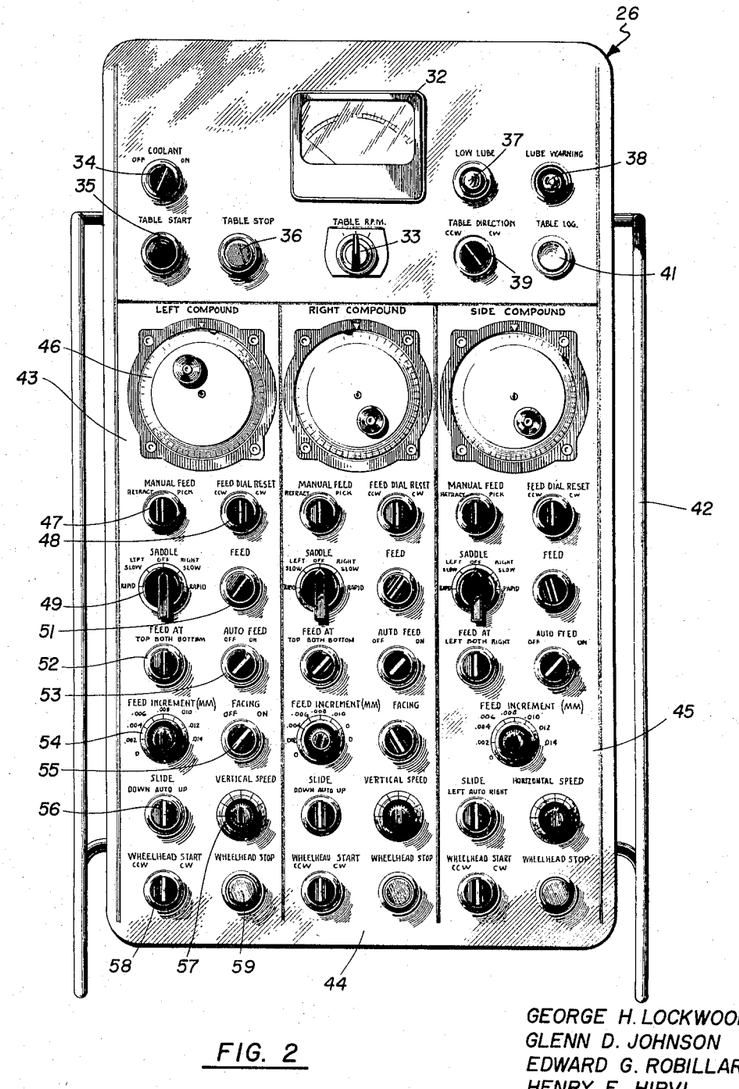
FIG. 2 is an enlarged view of a portion of the invention.

FIG. 2 shows the details of the control box 26 having at its upper portion a meter 32 which registers the speed of the rotation of the work table 21 and under it is located a knob 33 for regulating this speed of rotation. At one side of the meter is a coolant off-on switch 34, a table start button 35, and a table stop button 36. At the right side of the meter 32 is a warning light 37 which indicates when the level of lubricant fluid in the tank is low. Beside it is another warning light 38 which lights up when lubricant pressure is missing from some important part of the machine. At the same side of the meter is a table direction switch 39 as well as a table jog button 41. Extending along the right side of the control box 26 is an emergency bar 42 which, when struck, will shut down the machine in its entirety. The remainder of the surface of the box is occupied by control buttons arranged in three groups: a left-hand group 43, which has to do with the wheelhead 15, a central group 44, which has to do with the right-hand wheelhead 17, and a right-hand group 45, which has to do with the lower wheelhead 19. Since, as has been stated, the controls for the three wheelheads are substantially the same, the description will be limited to the left-hand group 43, it being understood that the controls for the groups 44 and 45 are almost exactly similar.

At the top of the left-hand group 43 is a feed dial 46 which shows the amount of feed of the wheel 29 toward the surface of the workpiece 23 since the last time the dial has been reset. This feed dial works both forwardly and backwardly to show the exact position of the wheel relative to the workpiece. Immediately underlying the feed dial is a manual feed switch 47 capable of being turned either to a "retract" position, a "pick" position, or a neutral position in between. Beside this last switch is a feed dial reset switch 48, which is shown in a neutral position but which is capable of being turned to a "CCW" or a "CW" position, these indicating either counter-clockwise or clockwise resetting of the feed dial 46. Underlying the manual feed switch 47 is a saddle switch 49 which is shown as positioned in an "off" position. It may be moved to the left to a "slow" or a "rapid" position, or it may be moved to the right to a "slow" or a "rapid" position. To the right of the switch 49 is a feed switch 51 which occupies either a "left" or a "right" position. Underlying the saddle switch 49 is a "feed at" switch 52 which is capable of being positioned at any one of three positions, namely "top," "both," or "bottom." To the right of the switch 52 is an "auto feed" switch 53 capable of occupying either an "off" or an "on" position. Underlying the "feed at" switch 52 is a "feed increment" knob 54 which is calibrated in millimeters and which can occupy the pointer positions from 0 to .014. To the right of this knob is a "facing" switch 55 capable of occupying either an "off" or an "on" position. Underlying the "feed increment" knob 54 is a "slide" switch 56 having three positions, namely, "down," "auto," or "up." To the right of the "slide" switch 56 is a "vertical speed" knob 57 which is calibrated to give a selection of desired vertical speeds in reciprocation of the wheel. Under the "slide" switch 56 is a "wheelhead start" switch 58 which is shown as occupying a neutral position but which may be turned to a "CCW" or a "CW" position, indicating either counter-clockwise or clockwise rotation of the wheelhead and the wheel. To the right of the "wheelhead start" switch is a "wheelhead stop" button 59.

Figure 3:
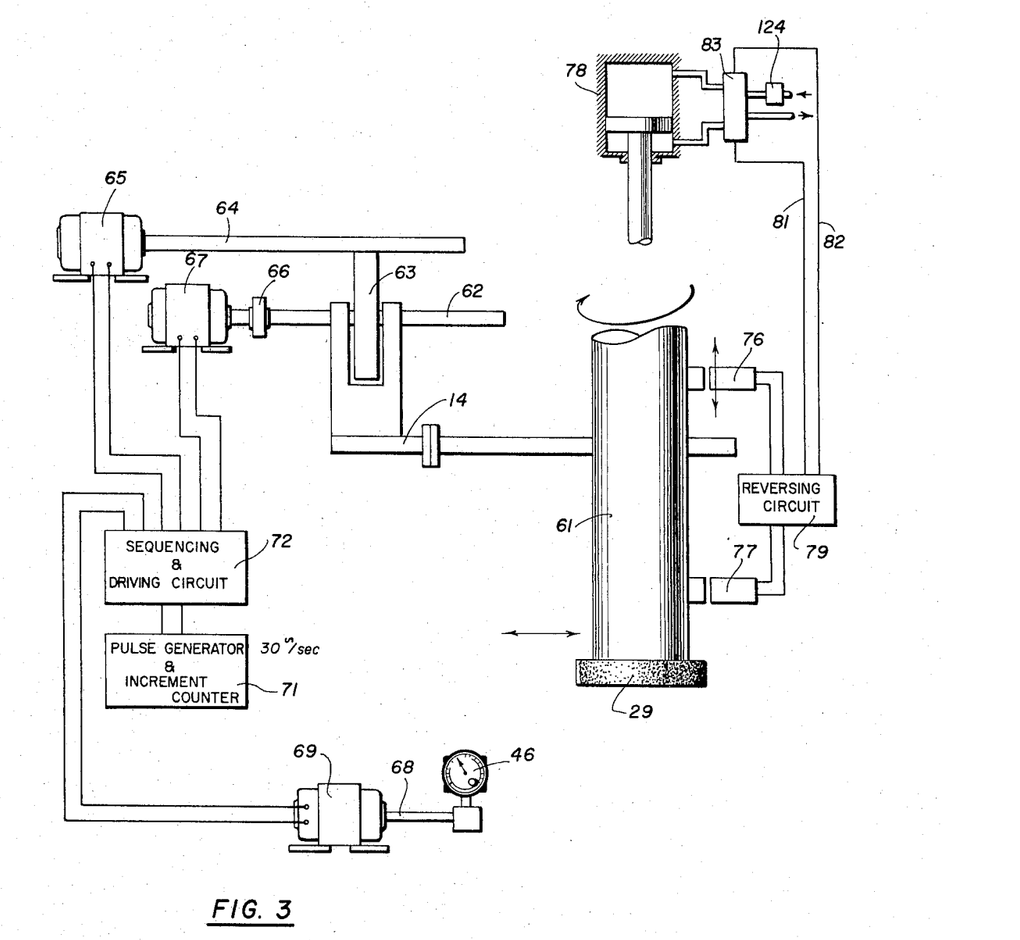
FIG. 3 is a schematic view of part of the apparatus.

FIG. 3 shows, in a general way, the manner in which the reciprocation and feed of the wheel 29 takes place. The spindle 61 is shown as mounted schematically on the left saddle 14 which is driven horizontally across the rail 13 by a main feed screw 62, there being a threaded engagement between the feed screw 62 and the saddle 14. In addition, the feed screw 62 has mounted on it a nut 63 which is driven by a secondary feed screw 64 which, in turn, is driven by a conventional three-phase induction motor 65. The main feed screw 62 is connected through a one-way clutch 66 to a stepping motor 67. This stepping motor is of the type whose rotor rotates through small angular increments in response to the receipt of electrical pulses. A pulse of a given polarity causes an increment of rotation of the motor and it is not until a pulse of a different polarity is received that the motor proceeds in another angular increment of motion. Such a motor is the "Slo-Syn" motor which is the trademark for the motor manufactured by the Superior Electric Company of Bristol, Conn., and the particular motor shown is their motor type X1000, which is capable of giving a torque of 1000 inch-ounces. The dial 46 is connected to the shaft 68 of a dial stepping motor 69; this stepping motor 69 is similar to the stepping motor 67 and is also of the "Slo-Syn" type manufactured by the Superior Electric Company of Bristol, Conn., and the particular motor used is their type SS50, which produces a torque of 50 inch-ounces. Now, the motor is provided with electrical pulses originating in a pulse generator and increment counter circuit 71, which is connected to a sequencing and driving circuit 72, which, in turn, is connected to the motor 67. The circuit 72 may be used to connect the motor 67 to a conventional 60 cycle alternating current electrical source. The circuit 72 may also be connected to the motor 65 to drive it directly. The motor 69 is connected to the leads going to the motor 67 in such a way that it receives the same pulses that the stepping motor 67 receives and rotates, therefore, in the same increments and direction to produce a change in the dial 46 indicative of the amount of feed. Located adjacent the wheel 29 and operated by magnetic dogs associated with it are two proximity switches 76 and 77, indicating the top and the bottom of the stroke. This stroke, incidentally, is produced by a hydraulic cylinder 78. The proximity switch is connected to a reversing circuit 79 which has the function of not only energizing the switches but sending pulses through lines 81 and 82 to a solenoid valve 83, which controls the flow of fluid to the cylinder 78 to reverse it and to assist in controlling its speed of operation.

Figure 4:
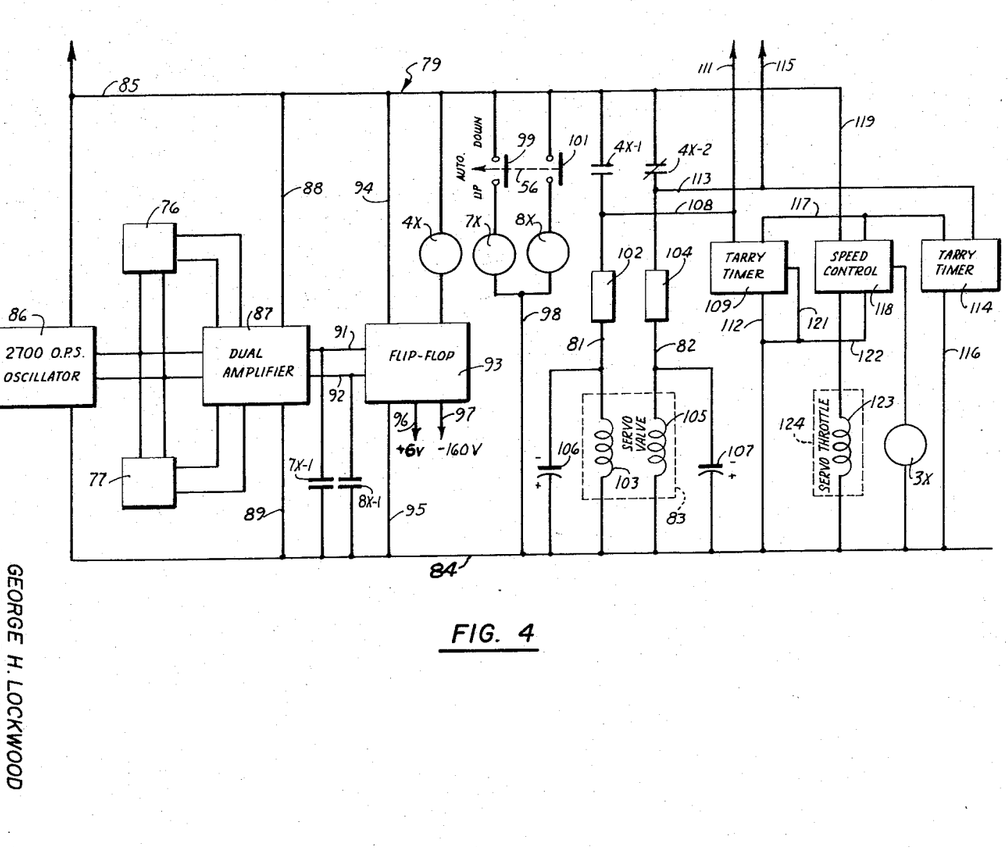
FIGS. 4, 5, 6, and 7 are electrical schematics of circuits forming a part of the present invention.

FIG. 4 shows, in a somewhat schematic manner, the details of the reversing circuit 79. The circuit is a somewhat isolated electrical arrangement including a power line 84 connected to ground and a power line 85 connected to a —28 volts direct current source. The pickup heads of the proximity switches 76 and 77, of course, form a part of the circuit, while the lines 81 and 82 control the valve 83. The lines 84 and 85 are connected to opposite sides of the input of an oscillator 86 which operates at 2700 cycles per second. The oscillator is, of course, connected to the heads of the proximity switches 76 and 77 and the outputs of the switches are inserted into a dual amplifier 87 which receives its input power through lines 88 and 89 connected, respectively, to the power lines 85 and 84. The output of the amplifier 87 appears on the lines 91 and 92. The line 91 is connected to the ground 84 through a normally-open contactor 7X–1, while the line 92 is connected to the ground through a normally-open contactor 8X–1.

The lines 91 and 92 are connected to the input of a flip-flop 93 which receives its power through lines 94 and 95 connected, respectively, to the line 85 and the ground line 84. In addition, the flip-flop is connected by a line 96 to a source of +8 volts D.C. electricity, while it is also connected by a line 97 to a —160 volts D.C. source. The output of the flip-flop is connected through the coil of a relay 4X to the —28 volts line 85.

A line 98 is connected at one end to the ground line 84 and at the other end connected to one end each of the coils of two relays 7X and 8X. The coil of the relay 7X is connected through a switch 99 to the line 85, while the coil of the relay 8X is connected through a switch 101 to the line 79, the switches 99 and 101 constituting parts of the slide switch 56 (see FIG. 2). The line 85 is connected through a normally-open contactor 4X–1 to one side of a 27-ohm resistor 102, the other side of which is connected through one coil 103 of the 4-way servo reversing valve 83 (see FIG. 3). Similarly, the line 85 is connected through a normally closed contactor 4X–2, through a 27-ohm resistor 104, and through the line 82 to one end of a coil 105 of the valve 83. The other ends of both coils 103 and 105 are connected directly to the ground line 84. A 250-microfarad capacitor 106 is connected around the coil 103, while a similar 250-microfarad capacitor 107 is connected around the coil 105. A point between the normally-open contactor 4X–1 and the resistor 102 is connected by a line 108 to the input of a tarry timer 109 and also to a line 111 leading to the feed circuitry, as will be described hereinafter. The timer 109 is also connected by a line 112 to ground. Similarly, a point between the normally-closed contactor 4X–2 and the resistor 104 is connected by a line 113 to a tarry timer 114 and also to a line 115 which goes with the line 111 to the feed circuitry. The timer 114 is connected by a line 116 to the ground line 84. The timers 109 and 114 are joined by a line 117 and the central portion of the line 117 is connected to a speed control 118. The speed control is connected by a line 119 to the high voltage line 85 and is connected by lines 121 and 122 to the line 112 leading to the ground line 84. The speed control 118 is also connected to ground through a coil 123 forming part of a servo throttle valve 124 controlling the flow of fluid to the valve 83 and, therefore, to the cylinder 78. In addition, the speed control is also connected through the coil of the relay 3X to the ground line 84.

Figure 5:
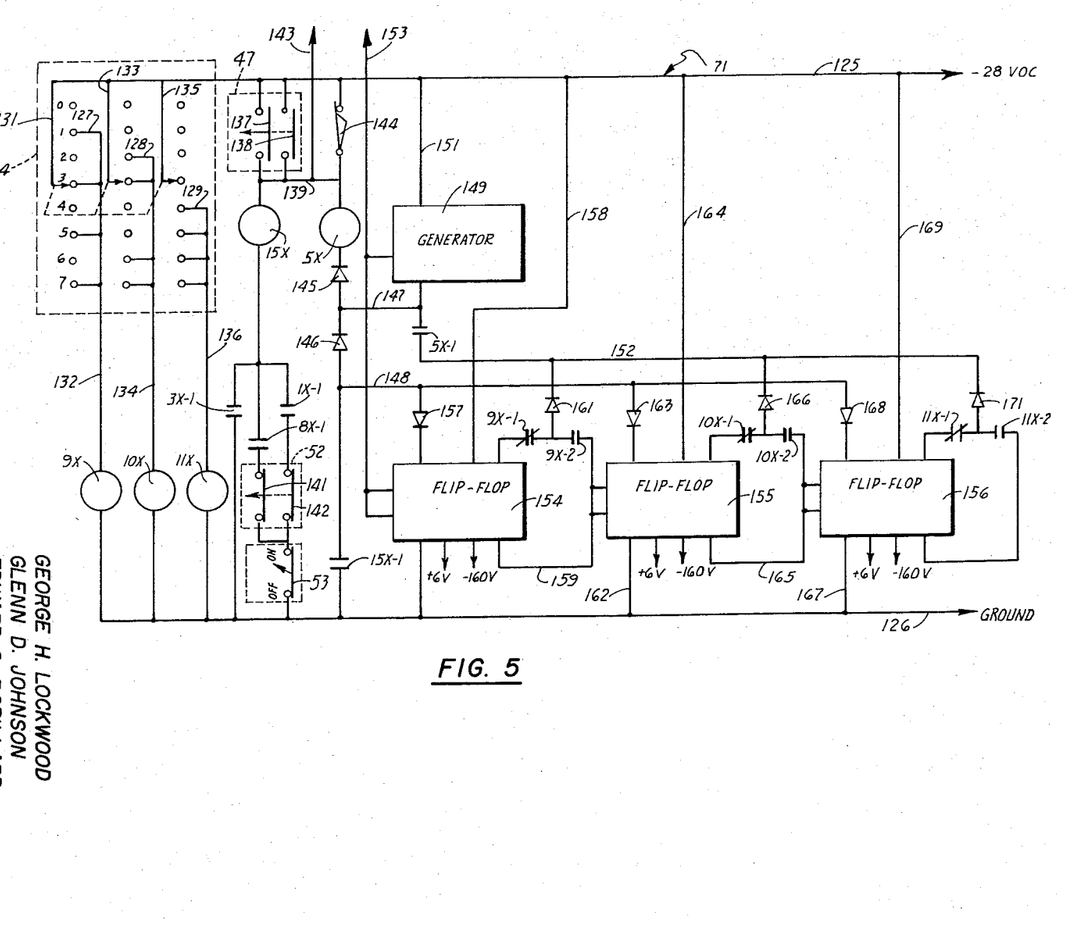

Referring now to FIG. 5, which shows the details of the pulse generator and increment counter circuit 71, the circuitry is provided with a power line 125 which is connected to a −28 volt D.C. source, and a line 126 which is a common or ground line. In the circuit is located the feed increment switch 54 which consists of three sections 127, 128, and 129. Section 127 has a contactor 131 capable of contacting any one of 8 buttons numbered 0 through 7, the buttons 1, 3, 5, and 7 being connected by a line 132 through the coil of a relay 9X to the ground line 126. Similarly, the section 128 is provided with a contactor 133 which is adapted to contact any one of 8 buttons, the buttons 2, 6, and 7 being connected by a line 134 through the coil of a relay 10X to the ground line 126. The section 129 is provided with a contactor 135 which is adapted to contact any one of 8 buttons, of which the buttons 4, 5, 6, and 7 are connected by a line 136 through the coil of a relay 11X to the ground line 126. The contactors 131, 133, and 135 are mechanically connected for simultaneous movement over the buttons.

The manual feed switch 47 is made up of a switch 137 and a switch 138, one side of each of the switches 137 and 138 being connected to the high voltage line 125. The other side of both of these switches is connected to a line 139 which serves as a common connection for a number of elements. First of all, the line 139 is connected to one side of the coil of a relay 15X, the other side of this coil being connected to the ground line 126 through a normally-open contactor 3X–1. Associated with this part of the circuit is the auto feed switch 53 when in the "on" position is closed and which is open when in the "off" position. Also associated with this section of the apparatus is the feed at switch 52. This switch 52 is formed of two switches, 141 and 142. Now, the other side of the coil of the relay 15X is connected through a normally-open contactor 8X–1 and the switch 141 (forming part of the feed at switch 52) and through the switch 53 to the ground line 126. Similarly, the other side of the coil of the relay 15X is connected through a normally-open contactor 1X–1, through the switch 142, and through the switch 53 to the ground line 126.

The common line 139 is also connected by a line 143 to the sequencing and driving circuits 72. It is also connected through a limit switch 144 (mounted in the feed meter) to the line 125. The line 139 is also connected to the ground line 126 through the following elements: the coil of a relay 5X, a rectifier 145, a rectifier 146, and a normally-open contactor 15X–1, these elements being mounted in series. The common point between the rectifiers 145 and 146 is connected to a line 147, while a common point between the rectifier 146 and the normally-open contactor 15X–1 is connected to a line 148. The line 147 is connected to one post of a generator 149 capable of generating electrical pulses at a frequency in the neighborhood of 30 cycles per second. The generator 149 is also connected by a line 151 to the high voltage line 125. The line 147 is also connected through a normally-open contactor 5X–1 to a line 152. The generator 149 is also connected to a line 153 leading to the sequencing and driving circuit 72.

Associated with this circuit are three flip-flops 154, 155, and 156. The line 153 is connected to the flip-flop 154 which is also connected to a +6 volts D.C. source and a −160 volts D.C. source. The flip-flop 154 is also connected through a rectifier 157 to the line 148 and by a line 158 to the high voltage line 125. The flip-flop 154 is connected by a line 159 to the flip-flop 155. The two flip-flops 154 and 155 are also connected through a normally-closed contactor 9X–1 and a normally-open contactor 9X–2 mounted in series, there being a rectifier 161 connected between the common point between these two contactors and the line 152.

Flip-flop 155 is connected by a line 162 to the ground line 126 and also is connected to a source of +6 volts D.C. power and a −160 volts D.C. source. This flip-flop is also connected through a rectifier 163 to the line 148 and connected by a line 164 to the high voltage line 125. The flip-flops 155 and 156 are joined by a line 165 and they are also joined by a normally-closed contactor 10X–1 and a normally-open contactor 10X–2 mounted in series with a rectifier 166 connected from the common point between these two contactors and the line 152. The flip-flop 156 is connected to the ground line 126 by a line 167 and is also connected to a source of +6 volts D.C. and a source of −160 volts D.C. The flip-flop 156 is connected through a rectifier 168 to the line 148. It is also connected through a line 169 to the high voltage line 125. One side of the flip-flop is connected to the other through a normally-closed contactor 11X–1 and a normally-open contactor 11X–2 connected in series, the central point being connected by a rectifier 171 to the line 152.

Figure 6:
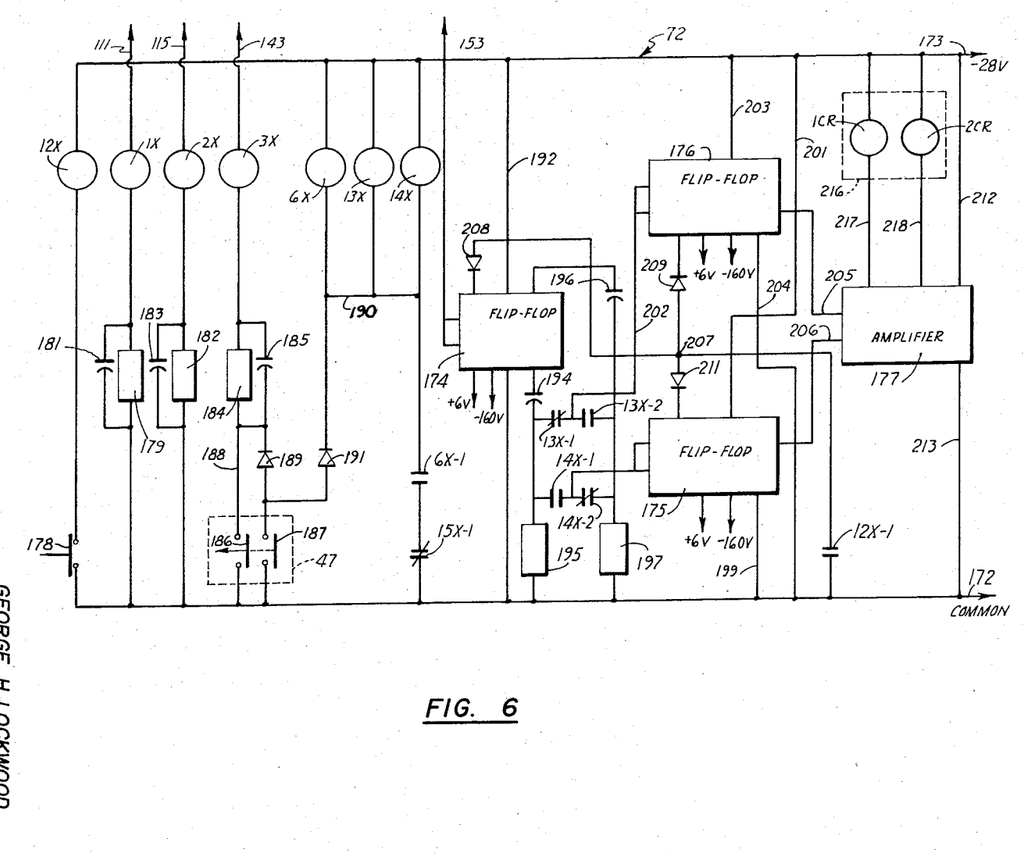

FIG. 6 shows the layout of the sequencing and driving circuit 72. This circuit is provided with a common or ground line 172 and a −28 volts D.C. line 173. Entering this circuit are the lines 111 and 115 originating in the reversing circuit 79, the line 153 originating in the generator 149 in the circuit 71, and the line 143 which originated in the increment counter of the circuit 71. Forming part of this circuit are three flip-flops 174, 175, and 176 and a driver or amplifier 177. The line 173 is connected through the coil of a relay 12X and a reset switch 178 to the ground line 172. The line 111 is connected through the coil of the relay 1X and through a 15-megohm resistor 179 to the ground line 172, there being a 5-microfarad capacitor 181 connected across the resistor. Similarly, the line 115 is connected through the coil of the relay 2X and through a 15-megohm resistor 182 to the ground line 172, there being a 5-megohm capacitor 183 connected across the resistor 182. The line 143 is connected through a coil of a relay 3X to one side of a 15-megohm resistor 184 across which is connected a 5-microfarad capacitor 185. Associated with this portion of the circuit are two switches 186 and 187 forming further parts of the manual feed switch 47. Two sides of these switches are connected to the ground line 172. The other side of the switch 186 is connected by a line 188 to the other side of the resistor 184. The other side of the switch 187 is connected through a rectifier 189 to the other side of the resistor 184. Furthermore, a common point between the switch 187 and the rectifier 189 is connected through a rectifier 191 and the coil of a relay 6X to the high voltage line 173. A common point between the rectifier 191 and the coil of the relay 6X is connected to a buss line 192 which is connected through the coil of a relay 13X to the high voltage line 173. The line 172 is also connected through the coil of a relay 14X to the high voltage line 173. Furthermore, the line 192 is connected through a normally-open contactor 6X–1 and a normally-closed contactor 15X–1 to the ground line 172.

The line 153 is connected to the flip-flop 174 which, in a manner similar to all of the flip-flops 174, 175, and 176, is connected to a +6 volt D.C. source and a −160 volt D.C. source. One side of the flip-flop 174 is connected by a line 192 to the high voltage line 173, while the other side is connected by a line 193 to the ground line 172. The flip-flop 174 is also connected to a .005-microfarad capacitor 194 and through a 4.7-megohm resistor 195 to the ground line 172. The flip-flop 174 is also connected through a .005-microfarad capacitor 196 and a 4.7-megohm resistor 197 to the ground line 172. A common point between the capacitor 194 and the resistor 195 is connected to a common point between the capacitor 196 and the resistor 197 by a normally-closed contactor 13X–1 and a normally-open contactor 13X–2 in series. Similarly, the same common points are connected by a normally-open contactor 14X–1 and a normally-closed contactor 14X–2 in series. The common point between the two contactors 14X–1 and 14X–2 is connected by a line 198 to the flip-flop 175 which is connected by a line 199 to the ground line 172 and by a line 201 to the high voltage line 173. A common point between the contactors 13X–1 and 13X–2 is connected by a line 202 to the flip-flop 176 which is connected by a line 203 to the high voltage line 173 and is connected to the ground line 172 by a line 204. The output of the flip-flop 176 is connected by a line 205 to the input of the amplifier 177, while the output of the flip-flop 175 is similarly connected to the amplifier by a line 206. A common point 207 in the circuitry is connected to the flip-flop 174 by a rectifier 208, to the flip-flop 176 by a rectifier 209, to the flip-flop 175 by a rectifier 211, and to the ground line 172 through a normally-open contactor 12X–1. The amplifier 177 receives its power by a line 212 connecting it to the high voltage line 173 and by a line 213 connecting it to the ground line 172. The output of the amplifier is connected to the high voltage line 173 through the coil of a relay 1CR and to a coil of a relay 2CR. These coils form part of a circuit 216 which is shown in detail in FIG. 7 and are connected to the amplifier by lines 217 and 218, respectively.

Figure 7:
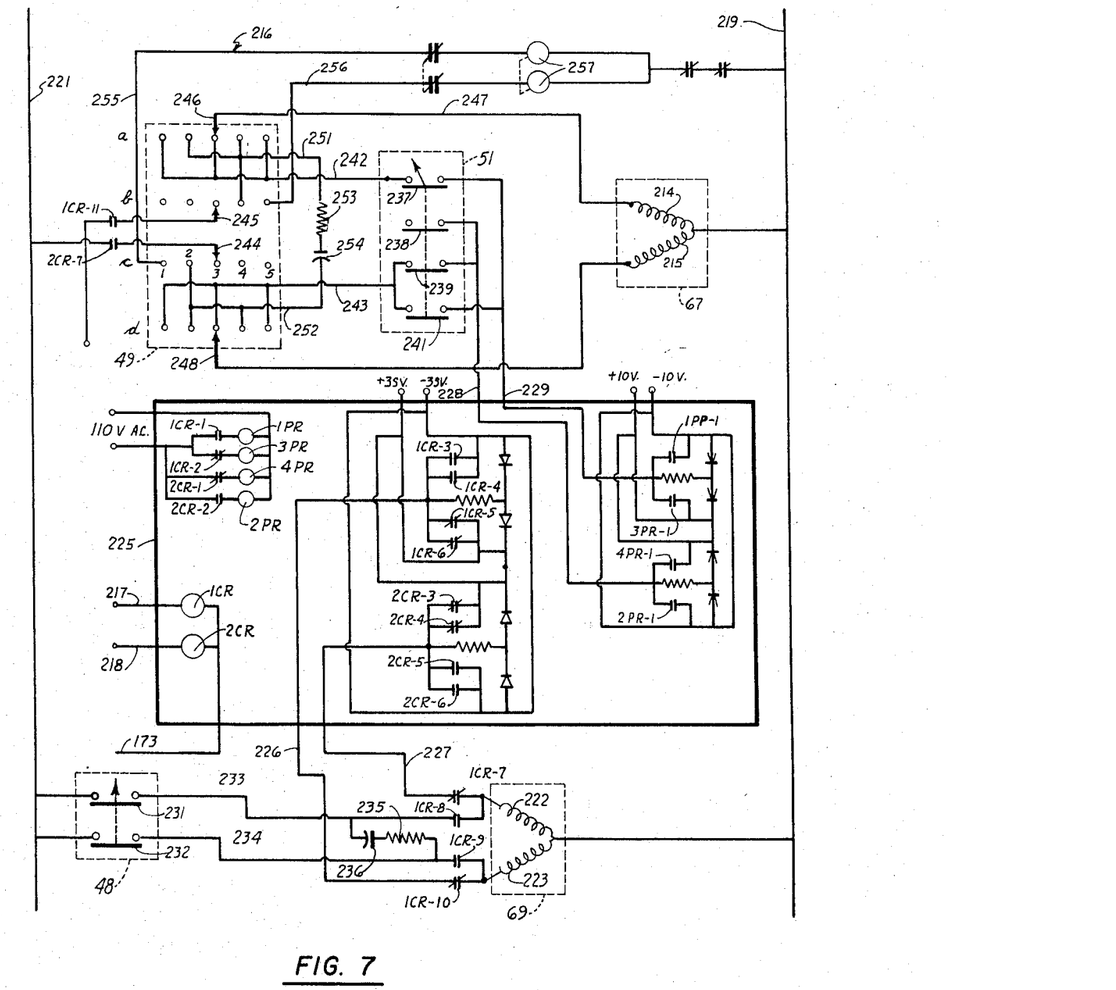

The circuit 216 shown in FIG. 7 is provided with main power lines 219 and 221 connected to a 110-volt A.C. electrical source. In the circuit is shown the main stepping motor 67 with its operating coils 214 and 215. Also included in the circuit is the dial stepping motor 69 having operating coils 222 and 223. The circuitry includes the saddle switch 49 and a relay box 225. To begin with, the lines 217 and 218, originating in the sequencing and driving circuit 72, are, as has been described above, connected to the power line 173 by the coils of the relays 1CR and 2CR. The contactors associated with these relays (namely, the normally-open contactor 1CR–1, the normally-closed contactor 1CR–2, the normally-closed contactor 2CR–1, and the normally-open contactor 2CR–2) are associated in series with, respectively, the coils of relays 1PR, 3PR, 4PR, and 2PR, these relays being of the power type. The last-named connectors and their associated relays are connected to a source of 110-volt A.C. electricity. Also associated with the relay 2CR are normally-open contactor 1CR–3, normally-open contactor 1CR–4, normally-closed contactor 1CR–5, and normally-closed contactor 1CR–6. Similarly, associated with the relay 2CR, are normally-closed contactor 2CR–3, normally-closed contactor 2CR–4, normally-open contactor 2CR–5, and normally-open contactor 2CR–6. These are connected to a source of −35 volt and +35 volt D.C. electricity and are connected to rectifiers and resistors in the manner shown. In accordance with the settings of the last-named series of contactors, the −35 or +35 volt D.C. electricity is imposed on lines 226 and 227 leading to the dial stepping motor 69. The power relays are also provided with contactors 1PR–1, 2PR–1, 3PR–1, and 4PR–1 which are connected to a source of −10 volts D.C. and +10 volts D.C. in the manner shown; they are also inter-connected with rectifiers and resistors. According to the settings of these contactors, the −10 volts and +10 volts DC. electricity is impressed on lines 228 and 229 leading to the stepping motor 67.

In the circuitry is included the feed dial reset switch 48 which consists of two switches 231 and 232, one side of each of which is connected to the power line 221. The other side of the switch 231 is connected by a line 233 through a normally-open contactor 1CR–8 to the side of the coil 222 of the dial stepping motor 69 that is not connected to the power line 219. Similarly, the other side of the switch 232 is connected by a line 234 through a normally-open contactor 1CR–9 to the outer end of the coil 223 of the stepping motor 69. The line 227 is connected through a normally-closed contactor 1CR–7 to the outer end of the coil 222, while the line 226 is connected through the normally-closed contactor 1CR–10 to the outer end of the coil 223. A phasing network consisting of a resistor 235 and a capacitor 236 connected in series is connected between the two lines 233 and 234. The feed switch 51 is also located in the circuitry and consists of a series of four switches 237, 238, 239, and 241. The line 228 is connected to one side of the switch 238 and one side of the switch 239. The other line 229 is connected to one side of the switch 237 and one side of the switch 241. The other side of the switch 237 is connected to a line 242, while the other side of the switches 241 and 239 are connected together and to a line 243. The saddle switch 49 consists of five sets of four buttons each, the sets being numbered 1, 2, 3, 4, and 5 and the individual buttons in each set being lettered *a*, *b*, *c*, and *d*, there being, therefore, 20 buttons in all. A contactor 244 works across the buttons in the "*c*" row and is connected back to the power line 221 through a normally-open contactor 2CR–7. A similar contactor 245 is connected through a normally-open contactor 1CR–11 to similar networks associated with the other wheelheads of the machine, the contactor 245 working along the "*b*" row. The "*a*" row is engaged by a contactor 246 which is connected by a line 247 directly to the outer end of the coil 214 of the stepping motor 67, the other end of which is connected to the grounded power line 219. The "*d*" row of buttons is engaged by a contactor 248 which is connected directly by a line 249 to the outer end of the coil 215 of the stepping motor 67, the other end of which is also connected to the power line 219. Buttons 1*a*, 1*b*, 1*c*, and 1*d* are the row indicated as "rapid left" movement. The buttons 2*a*, 2*b*, 2*c*, and 2*d* are in a row which is labeled "slow left." The row 3*a*, 3*b*, 3*c*, and 3*d* (where the contactors are shown as engaged) is the "off" position. The row of buttons 4*a*, 4*b*, 4*c*, and 4*d* are the row known as "slow right," while the row of buttons 5*a*, 5*b*, 5*c*, and 5*d* are in the row known as "rapid right." Buttons 1*a*, 3*a*, and 5*a* are connected directly to the line 242. The buttons 1*d*, 3*d*, and 5*d* are connected directly to the line 243. The buttons 2*a*, 4*a*, and 4*b* are connected to a line 251, while buttons 2*d*, 2*c*, and 4*d* are connected to a line 252. The lines 251 and 252 are joined by a phasing network consisting of a resistor 253 and a capacitor 254. In addition, the button 1*c* is connected to a line 255, while the button 5*b* is connected to a line 256. The lines 255 and 256 are connected through the starter relays 257 of the rapid traverse motor 65.

The operation of the invention may be readily understood in view of the above description. The machine tool of the invention is shown as a vertical grinding machine with a large diameter table and equipped with two vertical grinding slides and a horizontal grinding slide to perform a variety of grinding operations. These operations include internal, external, tapering, shoulder, lip, face, and surface grinding. The slides are reciprocated automatically or under manual control, the speed and direction being controlled from the swiveling pendant and the control box 26. Both vertical saddles can be positioned horizontally along the mounting plate or cross-rail 12 and the horizontal slide can be positioned vertically on the right-hand column of the machine. The cross-rail 12 can be elevated to any height depending on the type of work to be done.

The most frequently used controls are located on the pendant in front of the machine. This pendant is sectioned according to its four functions; at the top is located the table control, coolant switch and the lubrication lights. The table controls, as has been pointed out, provide for starting, stopping, jogging, and for direction as well as a direct reading speed meter and a speed control knob. The lower left section of the control box carries the left grinding compound controls. These include a directional wheel switch, a start switch, and a stop button. There are also controls for horizontal feed of the wheel against the work and for speed, direction, and automatic reciprocation of the vertical slide. At the top of this section is a direct reading feed meter which displays the action of the cross feed under all conditions except slow and rapid traverse. It also has a knob for the operator to record the amount of compensation for wheel wear. The facing switch 55 locks the grinding slide to the facing mechanism which can then be fed up and down by means of a hand wheel on the slide. The remaining two pendant sections are for the right vertical compound and the side compound and are identical to the left compound controls except that the side compound does not include the "facing" function. At the bottom along the side of the pendant is the emergency stop bar 42 which stops all machine functions. The pendant swivels to any area around the machine. Less frequently used controls are placed on a panel on the back side of the machine. The grinding slide tarry or "dwell" is set for the required duration in the range from 0 to 20 seconds. The tarry at the top and at the bottom or left and right (for the side head) can be set independently of one another. In addition, there are the hydraulic power start and stop buttons, an emergency stop button, a cross-rail "auto-unclamp" switch, a stop reset button, lubrication lights, and a lubrication injector button which should be pushed several times prior to operating the machine.

The grinding slide reciprocation reversal is accomplished by means of the manually positioned proximity switches 76 and 77. Precise location of the bottom reversal point is achieved by screwing the proximity leaf up and down from a nearest rack tooth interval. Loosening four swivel clamp bolts permits swiveling either slide at an angle of up to 45° on either side of the vertical by means of a ratchet wrench provided with the machine. This swiveling should be done with the slide at the bottom of its travel. At the lower edge of the grinding saddle is an optical position indicator which permits grinding of a series of parts to the same diameter. When a grinding wheel is in a position to start a grind, or at any time that the grind must be interrupted and a compound moved out of position, if the compound location is noted before being moved, it can be returned to its original location by stopping at this recorded indicator reading. When the dresser compensation is made, the feed meter compensating knob must be compensated the same amount, since the dresser is mounted on the feeding slide. At the top of the grinding slide is a wheelhead motor load meter. The extension of the wheelhead should be kept as small as possible, consistent with the length of grind being made. This extension is changed as follows: secure the head against falling with a crane hook, loosen two screws on each end of the housing and then loosen four clamp screws in the housing end rings. Be careful to clean the body of the wheelhead carefully before sliding it in or out. There is a tapped hole in the wheel end of the grinding spindle which may be used for extending or shortening the side head overhang, rather than using the eye bolt on the motor end.

To grind the top of the table or the workpiece clamps, incline the left-hand wheelhead to 15° counter-clockwise. Dress off the wheel parallel to the table top with a diamond in a holder on the table. Reciprocate the head using the slow traverse speed and switching from left to right traverse with the pendant switch. Feed the head downward by means of the facing mechanism. Note that, unless the cross-rail is parallel to the plane of the table thrust bearing, a concave or convex table top will be the result.

When the cross-rail is leveled, a note should be made of the location of each of the saddles on the cross-rail. The right-hand saddle should be in its extreme right-hand position and the left-hand saddle should be in such a position as to bring the grinding wheel with the head swiveled 15° counter-clockwise. Taking these steps before leveling the rail will assure the best conditions for grinding the table top flat. When raising or lowering the cross-rail, the best precision will then be obtained by putting the saddles in these locations. Also, if the cross-rail direction is up when the desired location is reached, the screws and gears will be loaded in the same manner as when the rail was leveled. To level the rail, switch from "auto" to "unclamp" on the cross-rail switch. The cross-rail is raised and lowered by an electric motor on top of the column. Speed is controlled by a hand throttle. The rail is clamped in position by a double toggle-actuated pair of clamp arms actuated to clamp the rail. On the left-hand end of the cross-rail there are two pressure-reducing valves which control the pressure to the counter-balance cylinders which assist the leveling screws.

In the preferred embodiment, a 15 horse power motor drives the table with 5 V-belts connecting the motor to a large pulley underneath the table. The belt tension is maintained by a hydraulic cylinder which slides the entire drive unit on the floor. Pressure is set by a pressure-reducing valve in the service cabinet and the belts can be slackened by means of a lever-operated valve beside the pressure reducer. The machine feed and reversal system consists of an electro-hydraulic control system for slide reciprocation and an electro-mechanical system for saddle feed and traverse motion along a feed and traverse axis. The grinding slide reversal is a system consisting of the two proximity pick-up units or switches 76 and 77 that work into the transistorized amplifier 87. The amplifiers control the state of the flip-flop system 93 which drives a mercury-wetted relay 4X. The contacts of the relay 4X energize the servo-type directional control valve 83 which controls the reversal point of the grinding slide. The speed of the grinding slide is controlled by varying the voltage on the coil 123 of the pressure-compensated servo throttle 124. Two independent dwells (which are adjustable from .1 to 20.0 seconds) are available at each end of the grinding slide by means of two transistorized timing units 109 and 114. The dwell is obtained by closing the servo valve 83 and de-energizing a mercury-wetted relay 3X that operates a stop valve.

The 10-volt 2700 cycles per second oscillator 86 is used to excite the pick-up units or switches 76 and 77. This oscillator consists of an R-C type two transistor oscillator which is transformer coupled into the power amplifier circuit 87. The proximity switches 76 and 77 consist of a primary and secondary coil in each unit. By means of laminated dogs on the grinding slide, a voltage above quiescent is induced in the secondary coil. This secondary voltage is fed into the dual amplifier unit 87. This unit consists of two pulse amplifiers and a bias circuit. The bias circuit operates from the 2700 cycle oscillator voltage which is rectified and filtered to an output of +7 volts D.C. By means of a potentiometer, the bias voltage for each input amplifier is used to cancel out the quiescent signal from the proximity pick-up units with no dog over the pickup. When a dog is positioned over a pickup, the secondary voltage from the pickup will exceed the bias voltage and negative pulses will appear at the output of the corresponding amplifier. The outputs of each amplifier are coupled to both sides of the flip-flop 93. The flip-flop will remain in either of two states of conduction, depending upon which input signal was received last. The output of the flip-flop operates the mercury-wetted relay 4X. This relay is either energized or de-energized depending upon the state of the flip-flop. The contacts of the output relay 4X are used to control the servo valve 83 which controls the direction of the slide. These contacts are also used to energize other relays through an R-C network to provide signals to the feed system.

To cause an independent adjustable dwell in either or both ends of the grinding stroke, the adjustable timing units 109 and 114 are used on each of the two reversal points. These timers are adjustable in a range of .1 to 20.0 seconds. The outputs are connected together and work into a voltage control unit 118. Whenever either of the two tarry timers is timing, the output of the voltage control unit is 0 volt, which de-energizes the servo throttle 124 stopping the slide. The voltage control unit also de-energizes the mercury-wetted relay that operates the stop valve. The stop valve will hold the slide locked in the stop position. When the timer times out the mercury-wetted relay becomes energized by the voltage control unit releasing the stop valve and the voltage through the servo throttle returns to the set voltage. This will allow the slide to move to the other reversal point which will again cause the slide to stop for a pre-set time, depending upon the setting of the timer. The speed of the slide is controlled by the setting of the potentiometer in the speed control unit 118. This unit contains a power transistor connected as an emitter follower with the servo throttle coil for the load. The voltage on the servo throttle is variable from 0 to −27 volts D.C. with the potentiometer in this unit.

The feed mechanism for the machine is an electromechanical system. The system consists of a grinding saddle which is moved along a feed and traverse axis by means of the ball screw 62. The travel along this feed and traverse axis is limited by limit and interference switches. The ball screw is rotated in either direction in any of the following three modes:

(1) Rapid traverse by means of the motor 65 which, in the preferred embodiment, is a ⅛ horsepower, 1725 r.p.m., 225 volt, 3-phase, 60 cycles saddle traverse motor. The traverse rate is 36 inches per minute with this motor.

(2) Slow traverse by means of the 1,000 ounce-inch synchronous stepping motor 67 which, in the preferred embodiment, runs on 110 volts single phase 60 cycles per second. This motor is located on the cross-rail 13 in the case of the vertical wheelheads and on the right-hand column for the horizontal wheelhead. In the preferred embodiment, the slow traverse rate is ¾ of an inch per minute.

(3) Incremental feeding by means of the same 1,000 ounce-inch stepping motor 67 operating in a 200 step per revolution mode. Rotation of the motor is accomplished by supplying a 10 volt D.C. supply to each motor winding and switching the motor winding polarity in an established sequence. The motor shaft moves ½₀₀ of a revolution or 1.8° for each switching of polarity. The number of steps per feed cycle is selected by means of the 8-position switch 54 (which is calibrated in millimeters). This means that up to seven incremental steps can be selected per cycle. The feed meter 46 located on the pendant (one for each grinding saddle) shows the amount of feed in the incremental feeding mode. A microswitch located in this feed meter will stop the automatic feed when the feed meter reaches 0. This switch can be overridden by the manual pick-retract switch 47 located on the control box. The mode of saddle movement is selected by means of the 5-position spring-return-to-center saddle switch 49 located on the control box.

Reference should be made to FIGS. 5, 6, and 7 in connection with the description of the incremental feeding mode apparatus described hereinafter. The circuit can be broken down into a counting section, a sequencing selection, a pulse generator, and a stepping motor driving unit. The counting section of the system consists of the three flip-flops 154, 155, and 156 connected as a binary counter. This counter counts the pulses from the generator 149 and stops the cycle when the desired number of pulses have been received. The desired count is selected by use of the feed increment switch 54 on the control box. This feed increment switch controls mercury-wetted relays 9X, 10X, and 11X which are necessary in order to isolate the feed system from the machine wiring, otherwise transient voltages would cause erratic operation of this system.

The sequencing section shown in FIG. 6 consists of the three flip-flops 174, 175, and 176, a relay drive or amplifier 177, and mercury-wetted relays 6X, 13X, and 14X. The input flip-flop 174 is triggered by the generator pulses. The two outputs from this flip-flop are fed into the flip-flops 175 and 176 through the relay contactors 13X–1, 13X–2, and 14X–1, and 14X–2. These relays along with the relay 6X are used to reverse the sequencing which reverses the direction of the stepping motor 67. This is accomplished by inter-changing the inputs of flip-flops 175 and 176. Differentiating networks consisting of the resistor 195 and the capacitor 194, on the one hand, and the resistor 197 and the capacitor 196, on the other hand, are required to prevent the flip-flops 175 and 176 from being triggered when their binary leads are switched. The outputs of the flip-flops 175 and 176 are connected to two transistorized driver amplifiers 177 which control two 28-volt D.C. relays 1CR and 2CR in the stepping motor driving unit (FIG. 7).

The generator 149 consists of an R-C network used to determine the pulse or step-rate of the system. This R-C network works into a unijunction transistor which produces pulses when the command line is grounded. The pulse rate is adjusted by means of a trim potentiometer located on the generator mount.

As is evident in FIG. 7, the driving unit includes 228 volt D.C. control relays 1CR and 2CR. Contacts of these relays are used to control the four power relays 1PR, 2PR, 3PR, and 4PR. The power relay contacts are used to switch the polarity of the 10-volt D.C. supply to the 1,000 ounce-inch stepping motor 67. This is done in the proper sequence which is established by the flip-flops 174, 175, and 176.

Another set of contacts from the control relays 1CR and 2CR are used to switch the polarity of the 35-volt D.C. supply to the dial stepping motor 69. This motor is located in the feed meter 46 which, of course, is mounted on the control box. A resistor diode arrangement is used to protect the contacts of the 100-volt D.C. power relays. The contacts of the −28 volt D.C. relay, which switches for the benefit of the dial stepping motor 69, are also protected in the same manner.

The feed cycle operates as follows: the system is turned on and the rear push button 128 located in the rear station is pressed. A contact block from this button energizes the relay 12X which sets the three sequencing flip-flops 154, 155, and 156 to their "high" state insuring correct feed direction. A feed increment is set on the feed increment switch 54 which energizes the relays 9X, 10X, and 11X in a binary coded relationship. This determines the number of pulses to be accepted by the counter and, in turn, the steps which the stepping motors will make during the feed cycle. The contacts of these relays are connected to the command line through an "OR" network of diodes. A cycle start signal is supplied to the system through either the relay 1X (slide up reversal point on the vertical wheelheads), 2X (slide down reversal point), or 3X (pick-retract). One of these relays will momentarily close by means of an R-C network in series with the relay coil. The momentary closure of one of these contacts will cause the relay 15X to pulse in. This will set the counter flip-flops to their "low" state in preparation to count. The relay 15X also actuates the relay 5X and energizes the command line. The relay 5X will rock up through the counter flip-flops 154, 155, and 156 and keep the command line energized. This starts the pulse generator 149 which continues to pulse until the set count is reached. When this set count occurs, all of the flip-flop outputs which are connected to the command line will be above ground. This will stop the generator 149 and allow the relay 5X to de-energize completing the counting cycle.

While the generator 149 is operating, its pulses are also being fed to the sequencing flip-flop 174 (FIG. 6). This flip-flop is driving the other two sequence flip-flops 175 and 176 in accordance with the position of the direction setting relays 6X, 13X, and 14X. The outputs of the last two flip-flops are amplified in the driver or amplifier 177 and used to actuate the 28-volt D.C. relays 1CR and 2CR in the driving unit.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A grinding machine for machining a surface of revolution in a workpiece, comprising
   (a) a workpiece table having a work surface,
   (b) a wheelhead having a spindle extending toward the table,
   (c) a feed screw for moving the wheelhead relative to the table to bring about the said machining,
   (d) a stepping motor operatively connected to the feed screw and rotative in a small increment in response to the receipt of an electrical pulse,
   (e) a generator of electrical pulses,
   (f) means selectively adjustable to regulate the transmission of electrical pulses from the generator to the stepping motor, and
   (g) means to reciprocate the wheelhead spindle longitudinally in a predetermined stroke, the said selectively-adjustable means operating to transmit pulses from the generator to the stepping motor only at the end of a stroke.

2. A grinding machine as recited in claim 1, wherein means is provided for selectively connecting the stepping motor to a conventional source of sixty-cycle per second alternating current electricity, the pulses from the said source being impressed on the stepping motor continuously.

3. A grinding machine for machining an internal surface of revolution in a workpiece, comprising
   (a) a workpiece table having a work surface,
   (b) a wheelhead having a spindle overlying the table,
   (c) a feed screw for moving the wheelhead relative to the table to bring about the said machining,
   (d) a stepping motor operatively connected to the feed screw and rotative in a small increment in response to the receipt of an electrical pulse,
   (e) a generator of electrical pulses,
   (f) means selectively adjustable to regulate the transmission of electrical pulses from the generator to the stepping motor, the said means comprising a plurality of flip-flop circuits arranged to admit to the stepping motor a selected number of the total pulses emitted from the generator, the said means also including an increment counter connected on its input side to receive all the pulses from the generator and to emit from its output side a predetermined number of all the pulses, the output of the counter being connected through an amplifier and a sequencing circuit to the stepping motor, the operation of the sequencing circuit serving to determine the direction of rotation of the stepping motor,
   (g) a conventional electrical motor also connected to the feed screw for high speed operation thereof, and
   (h) means for alternately presenting to the stepping motor pulses from the generator or pulses from a 60-cycle per second alternating current source.

References Cited

UNITED STATES PATENTS

| | | | |
|---|---|---|---|
| 2,674,706 | 4/1954 | Knosp et al. | 318—39 X |
| 2,687,759 | 1/1959 | Comstock. | |
| 3,015,806 | 1/1962 | Wang et al. | |
| 3,089,988 | 5/1963 | Stillings. | |
| 3,191,205 | 6/1965 | Gilbert. | |
| 3,231,801 | 1/1966 | Lang | 310—49 X |
| 3,246,218 | 4/1966 | Centner et al. | 318—8 |

ORIS L. RADER, *Primary Examiner.*

T. E. LYNCH, *Assistant Examiner.*